United States Patent
Lin et al.

(10) Patent No.: US 8,023,919 B2
(45) Date of Patent: Sep. 20, 2011

(54) RECEIVER DYNAMICALLY SWITCHING TO PSEUDO DIFFERENTIAL MODE FOR SOC SPUR REDUCTION

(75) Inventors: Charles G. Lin, Austin, TX (US); Burak Kelleci, Dallas, TX (US); Halil Kiper, Dallas, TX (US); Yuanying Deng, Murphy, TX (US)

(73) Assignee: Texas Instruments Incorporated, Dallas, TX (US)

( * ) Notice: Subject to any disclaimer, the term of this patent is extended or adjusted under 35 U.S.C. 154(b) by 443 days.

(21) Appl. No.: 12/315,926

(22) Filed: Dec. 8, 2008

(65) Prior Publication Data

US 2010/0144304 A1 Jun. 10, 2010

(51) Int. Cl.
*H04B 1/10* (2006.01)

(52) U.S. Cl. ...................... 455/296; 455/232.1

(58) Field of Classification Search ............... 455/232.1, 455/253.2, 296, 333; 330/51
See application file for complete search history.

(56) References Cited

U.S. PATENT DOCUMENTS 5,994,955 A * 11/1999 Birkeland .................. 330/51
7,822,400 B1 * 10/2010 Son .............................. 455/296

* cited by examiner

*Primary Examiner* — Long Nguyen
(74) *Attorney, Agent, or Firm* — Ronald O. Neerings; Wade James Brady, III; Frederick J. Telecky, Jr.

(57) ABSTRACT

A low noise amplifier in an integrated circuit, the circuit having a digital portion and an analog portion on a common substrate, the digital portion having at least one clocking frequency, includes an input configured to receive a signal at a tuned frequency and an output circuit. The output circuit is configurable to operate in either a single-ended mode or a pseudo differential-ended mode, wherein the output circuit is configured in the pseudo differential-ended mode when the tuned frequency is substantially similar to the at least one clocking frequency or one of its harmonics and otherwise configured in the single-ended mode.

20 Claims, 2 Drawing Sheets

RECEIVER DYNAMICALLY SWITCHING TO PSEUDO DIFFERENTIAL MODE FOR SOC SPUR REDUCTION

BACKGROUND

1. Field

The present invention relates generally to radio frequency (RF) circuitry and, more particularly, to System-on-a-Chip (SOC) circuitry.

2. Description of Related Art

There are a number of instances where it is beneficial to combine both analog circuitry and digital circuitry in an integrated circuit design. One approach is commonly known as System-in-a-Package (SIP) design and another common approach is known as System-on-a Chip (SOC) design. While both approaches have their own benefits and difficulties, one particular benefit of the SoC approach is that a common substrate may be used for both the analog and digital circuitry. However, using the same substrate for both types of circuitry raises some issues that must be overcome.

One useful analog circuit that may be implemented within an SoC approach is a Low-Noise Amplifier (LNA) that receives radio frequency signals and provides them to further downstream digital circuitry. It has been observed, however, that an LNA can be susceptible to noise generated by the digital circuitry sharing the substrate on which both circuits are formed and it is desirable to reduce the effect such noise has on the operation of the LNA.

Two characteristics of an LNA that can be used to measure its performance are its sensitivity and its power consumption. One approach to suppress noise generated by digital circuitry is to use a fully differential-ended circuit so that complementary signals are generated and used within the LNA. While this approach does improve receiver sensitivity, it dramatically increases power consumption as well.

An opposite approach is to utilize a single-ended LNA design. This approach reduces the power consumption of the LNA but also increases its susceptibility to certain types of noise.

Accordingly, there remains a need for an LNA design with low power consumption characteristics but that also suppress noise, especially in an environment such as SoC circuitry.

BRIEF SUMMARY

Embodiments of the present invention relate to a low noise amplifier in an integrated circuit, the circuit having a digital portion and an analog portion on a common substrate, the digital portion having at least one clocking frequency. Such a low noise amplifier includes an input configured to receive a signal at a tuned frequency; and an output circuit. The output circuit is configurable to operate in either a single-ended mode or a pseudo differential-ended mode, wherein the output circuit is configured in the pseudo differential-ended mode when the tuned frequency is substantially similar to the at least one clocking frequency or one of its harmonics and otherwise configured in the single-ended mode.

Additional embodiments of the present invention relate to a low noise amplifier in an integrated circuit, the circuit having a digital portion and an analog portion on a common substrate. The low noise amplifier includes an input configured to receive a signal at a tuned frequency and first and second amplifiers. The first amplifier is in communication with the input and configured to generate a first amplifier output based on the signal. The second amplifier is configured to generate a second amplifier output, wherein the second amplifier is configurable in a first mode and a second mode. In the first mode the second amplifier output is a high-impedance state and in the second mode the second amplifier output is related to noise coupled from the common substrate to the second amplifier. The low noise amplifier also includes an output configured to provide the first amplifier output and the second amplifier output as output signals of the low noise amplifier.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF DRAWINGS

Various aspects of embodiments of the invention are illustrated by way of example, and not by way of limitation, in the accompanying drawings, wherein.

DETAILED DESCRIPTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

Figure 1:
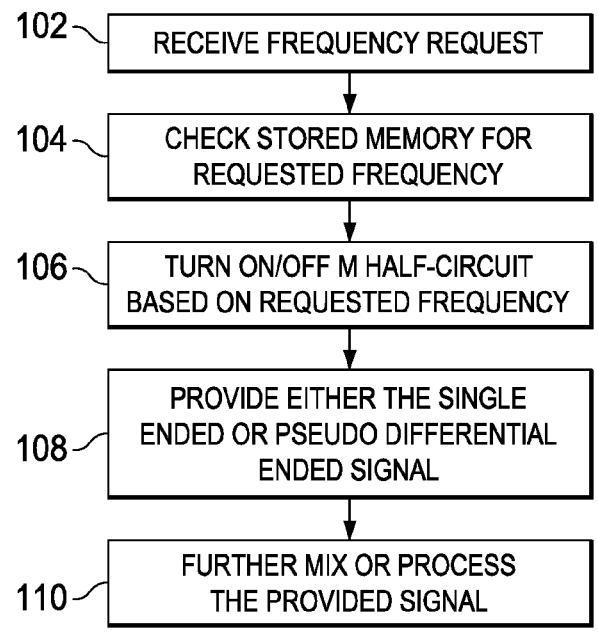
FIG. 1 depicts a flowchart of one exemplary method of reducing spur noise in accordance with the principles of the present invention.

FIG. 1 depicts a flowchart of one exemplary method of reducing the effect of spur noise in accordance with the principles of the present invention. In the description below, reference is made to System-on-a-Chip (Soc) design as one exemplary environment in which embodiments of the present invention may be practiced. However, one of ordinary skill will recognize that other, present or future, mixed signal ASIC design techniques are also contemplated without departing from the scope of the present invention. Also, certain specific embodiments are described which refer to an FM radio receiver or other similar circuitry. However, television signal tuners, GPS receivers, and the like will also benefit from embodiments of the present invention.

The LNA portion of a radio-frequency circuit, such as, for example, a radio receiver, usually receives signals from an attached antenna and amplifies them so that they can be mixed and further processed by subsequent circuits within the receiver. In a mixed signal ASIC environment, such as an SoC design, it has been discovered that spur noise can have a detrimental effect on the sensitivity of the receiver. Spur noise refers to noise from the digital circuits that is coupled through the substrate to the analog circuitry also sharing that substrate. Such noise occurs mostly at the digital clock frequency and its harmonics. Thus, by knowing the frequency at which the digital circuitry is clocked, it is known at which frequencies, spur noise has the potential for the greatest affect on the LNA circuitry. As described below, this knowledge is helpful in combating the affect of spur noise without dramatically increasing power consumption.

An LNA designed in accordance with the principles of the present invention will be described in the context of a RF receiver that has a number of well known and well understood components. The specific details of the well known components are not discussed in great depth so as not to obscure the novel aspects of methods and devices described herein.

A typical RF receiver will include a microcontroller or some similar programmable controller that receives input that indicates that a particular tuning frequency is desired. In the flowchart of FIG. 1, this is referred to in step 102 as receiving a frequency request. In response, the microcontroller, as is well known, takes the steps necessary to control a synthesizer to produce a signal that can be mixed with an incoming received signal so that the incoming signal is converted to a more useful frequency for amplification, filtering and other processing.

In addition, however, in accordance with the method of FIG. 1, the microcontroller, in step 104, checks a memory store to determine if the requested frequency matches a frequency stored within the memory. The memory store has stored therein the frequencies of the one or more digital clocks and their harmonics. In this way, the microcontroller can determine whether the requested frequency is one that is highly susceptible to spur noise or whether spur noise is only a minor concern. One of ordinary skill will recognize that there are a number of ways to store and retrieve this information without departing from the scope of the present invention. For example, merely the base clock frequencies may be stored and a separate arithmetic routine calculates the harmonics values for comparison or, alternatively, the frequency value of the one or more clocks and their respective first three (for example) harmonics may be stored within the memory. Similarly, the comparison for a "match" may determine that absolute equality of the requested frequency and the stored frequency is not necessary but that a "match" occurs when the two values are within 10% (or some higher or lower percentage) of each other.

Based on whether the requested frequency is in the stored memory, the microcontroller configures the LNA circuitry, in step 106, appropriately. If a match occurs, then the LNA is configured to reduce the effect of spur noise. If no match occurs then the requested frequency is not one significantly impacted by spur noise and the LNA is configured to maintain low power consumption.

In a differential-ended LNA, two complementary circuits are provided that generate two signals with the "P" signal typically considered the positive signal and the "M" signal typically considered the negative signal. When spur noise is not a concern, only the P-side circuitry is activated, thereby creating a single ended LNA, and thus power consumption remains low. However, when spur noise is a concern, the microcontroller will activate M-side circuitry that mimics some of the behavior of a differential ended LNA so that the effect of the spur noise can be mitigated.

If the M-side circuitry is not in an activated state and a newly requested frequency is found in the memory store, then the microcontroller will activate the M-side circuitry. If, alternatively, the M-side circuitry is currently activated and the newly requested frequency is not in the memory store, then the microcontroller deactivates the M-side circuitry. Thus, based on the control of the M-side circuitry in step 106, the LNA provides, in step 108 either a single-ended signal or a pseudo differential-ended signal to subsequent stages of the receiver. Within the receiver, additional steps of mixing and processing of the provided signal occur (step 110).

Figure 2:
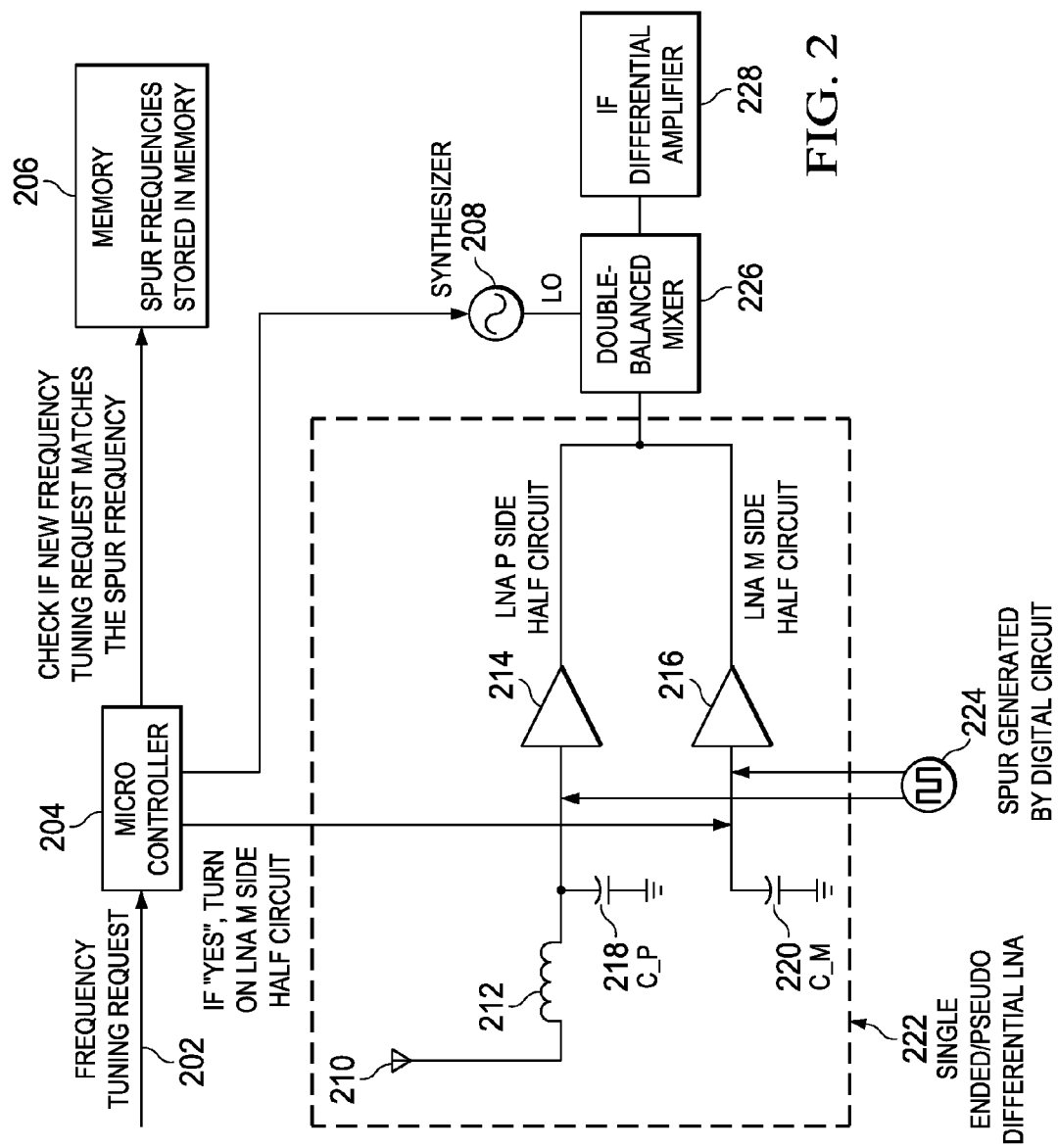
FIG. 2 depicts an idealized circuit schematic capable of implementing the flowchart of FIG. 1.

FIG. 2 depicts a conceptual circuit schematic capable of implementing the method just described with respect to the flowchart of FIG. 1. As before, a frequency tuning request 202 is received to be processed by the microcontroller 204. In response, the microcontroller checks to see if the requested frequency 202 is stored in the memory 206. Because if it is stored there, then the requested frequency is one that is known to be susceptible to spur noise. The microcontroller also controls a synthesizer 208 or other local oscillator to produce the appropriate mixing frequencies for the mixer 226 in order to convert the incoming signal to an intermediate frequency for the IF amplifier 228.

The LNA circuitry 222 produces either a singled ended signal or a pseudo-differential signal that is provided to the mixer 226. In operation, an RF signal is received at the antenna 210 and the input impedance-matching circuit including inductor 212 and capacitor 208, this signal is provided to an amplifier 214 that amplifies the signal before providing it to the mixer 226. In one configuration, a second amplifier 216 is not activated which causes its output to be a high impedance and in this way, the LNA provides a single-ended signal to the mixer 226.

In another configuration, however, the amplifier 216 may be activated so that it does provide an output signal to the mixer 226. As shown in FIG. 2, the input of the amplifier is clamped to ground through a capacitor 220 instead of being coupled with an input impedance-matching circuit similar to that of the amplifier 214. Thus, a true full differential-ended signal is not being generated for the mixer 226. Instead, the output of the amplifier 216 varies according to the spur noise 224 that is coupled through the substrate from the digital circuits. This spur noise 224 is also similarly coupled to the amplifier 214. As a result, a pseudo differential-ended signal is supplied to the two inputs of the mixer 226.

One particularly beneficial mixer design is commonly known as a double-balanced mixer. This type of mixer can accommodate the apparent single-ended signal when only amplifier 214 is activated and also the pseudo differential-ended signals when both amplifiers 214, 216 are activated. According to this mixer design, similarly occurring signals on each of the two inputs can be rejected as a common mode signal. As a result, when the pseudo differential-ended signals are provided to the mixer 226, the effect of the spur noise on the amplifier 214 can be rejected.

In operation, the microcontroller 204 determines whether to activate (or deactivate) the LNA M-side half circuit based on whether the requested frequency is one that is known to be susceptible to spur noise. By activating the M-side half circuit only when needed to combat spur noise, the LNA operates as a single-ended LNA and benefits from lower power consumption. However, when spur noise may be an issue, the M-side half circuit is activated so that a pseudo differential-ended LNA may be employed to combat the effects of spur noise on the receiver's sensitivity.

Figure 3:
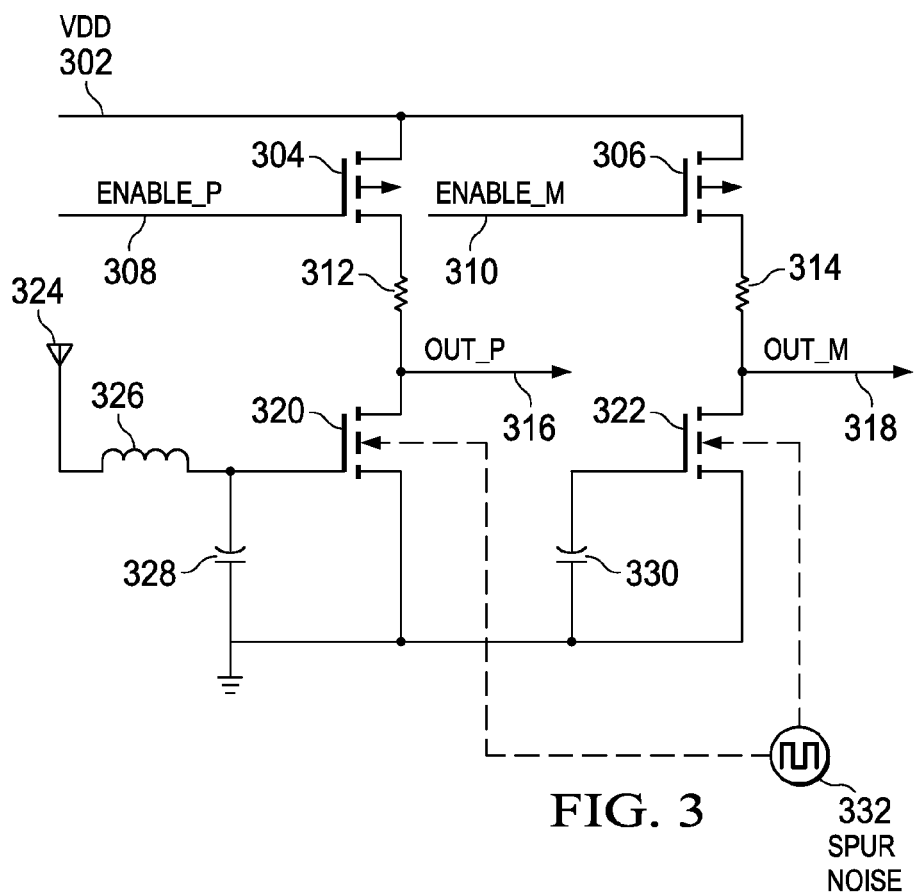
FIG. 3 depicts an exemplary device-level implementation of the Low Noise Amplifier (LNA) portion of the schematic of FIG. 2.

FIG. 3 depicts an exemplary device-level implementation of the LNA portion of the schematic of FIG. 2. In general, a signal is received by the antenna 324, inductor 326 and capacitor 328. This signal is provided to the gate of an N-channel MOSFET 320. The signal level at the gate 320 results in an amplified signal OUT_P 316. This signal 316 is provided to further stages within the receiver circuitry.

Activation of the P-side and M-side half circuits is controlled by P-channel MOSFETs 304, 306, respectively. An ENABLE_P signal 308 from the microcontroller turns on and off the MOSFET 304; while an ENABLE_M signal 310 is used to turn on and off the MOSFET 306. The MOSFET 304 is typically enabled but one of ordinary skill will recognize that the circuit of FIG. 3 allows it to be turned on or off independent of the MOSFET 306.

In addition to the behavior of MOSFET 320 described above, the resulting signal OUT_P 316 is also affected by spur noise 332 which is coupled to the channel of the MOSFET 320 through the substrate. MOSFETs are known to have a $V_{BS}$ which refers to the body to source biasing of the MOSFET which is typically assumed to remain constant. However, in the presence of coupled substrate noise, this biasing is not constant and the value of the signal OUT_P 316 is affected. To compensate for this affect, an M-side MOSFET 322 is provided with its gate clamped through capacitor 330 to ground. This other MOSFET 322 is similarly affected by the coupled substrate noise and produces a signal OUT_M 318 whose value is directly based on the coupled substrate noise. The signals OUT_P 316 and OUT_M 318 provide a pseudo differential-ended signal. An appropriately configured mixer or other signal processor can then be used to compensate for the spur noise component that is present in both signals OUT_P 316 and OUT_M 318.

Within FIG. 3 respective capacitors 328, 330 are depicted coupling the MOSFET gates to ground. The values of these capacitors are selected so that the gate impedance of MOSFET 320 matches the gate impedance of the MOSFET 322. By matching the gate impedances, the spur noise coupling to the backgates of the MOSFETS will have similar gain and phase in the OUT_P 316 and OUT_M 318 signals. This improves the ability of the double balanced mixer to reject the coupled spur noise as a common mode signal.

In the above example certain FETs where identified as either P-channel or N-channel. One of ordinary skill will readily recognize that opposite polarity doped FETs may be substituted with only minor variations to the described circuitry.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with each claim's language, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. Also, the term "exemplary" is meant to indicate that some information is being provided as an example only as is not intended to mean that that information is somehow special or preferred. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A low noise amplifier in an integrated circuit, the circuit having a digital portion and an analog portion on a common substrate, comprising:
    an input configured to receive a signal at a tuned frequency;
    a first amplifier in communication with the input and configured to generate a first amplifier output based on the signal;
    a second amplifier configured to generate a second amplifier output, the second amplifier configurable in a first mode and a second mode, wherein in the first mode the second amplifier output is a high-impedance state and in the second mode the second amplifier output is related to noise coupled from the common substrate to the second amplifier; and
    an output configured to provide the first amplifier output and the second amplifier output as output signals of the low noise amplifier.

2. The low noise amplifier of claim 1, wherein in the first mode the second amplifier is not enabled and in the second mode the second amplifier is enabled.

3. The low noise amplifier of claim 1, wherein when the second amplifier is in the first mode the low noise amplifier consumes less power than when the second amplifier is in the second mode.

4. The low noise amplifier wherein the second amplifier operates in the first mode when an enable signal is in a first state and operates in the second mode when the enable signal is in a second state.

5. The low noise amplifier of claim 4, wherein the enable signal is set to the first or second state based on the tuned frequency.

6. The low noise amplifier of claim 1, wherein the noise is related to at least one clock frequency utilized within the digital portion.

7. The low noise amplifier of claim 6, wherein the second amplifier is configured in the first mode when the tuned frequency is substantially different than the at least one clock frequency and its harmonics.

8. The low noise amplifier of claim 6, wherein the second amplifier operates in the second mode when the tuned frequency is substantially similar to either the at least one clock frequency or one of its harmonics.

9. The low noise amplifier of claim 6, further comprising:
    a memory configured to store the at least one clock frequency;
    a controller, coupled with the memory and wherein the controller configures the second amplifier in the first and second modes based on whether the tuned frequency is substantially similar to any frequency stored in the memory.

10. The low noise amplifier of claim 1, wherein the first amplifier output includes a portion related to noise coupled from the common substrate to the first amplifier.

11. The low noise amplifier of claim 10, further comprising:
    a mixer having an input coupled to the output signals of the low noise amplifier.

12. The low noise amplifier of claim 11, wherein the mixer is a double balanced mixer.

13. A method of receiving a radio frequency signal in an integrated circuit, the circuit having a digital portion and an analog portion on a common substrate, comprising:
    receiving the radio frequency signal at a tuned frequency;
    amplifying the received radio frequency signal using a first amplifier to generate a first amplifier output based on the received radio frequency signal;

configuring a second amplifier in either a first mode or a second mode, wherein in the first mode the second amplifier output is a high-impedance state and in the second mode the second amplifier output is related to noise coupled from the common substrate to the second amplifier; and providing, as output signals, the first amplifier output and the second amplifier output.

14. The method of claim 13, wherein the first amplifier output includes a portion related to noise coupled from the common substrate to the first amplifier.

15. The method of claim 14, further comprising:
receiving the output signals as inputs to a double balanced mixer.

16. The method of claim 13, further comprising:
storing in a memory one or more frequencies;
determining if the tuned frequency is substantially similar to any of the one or more frequencies;
configuring the second amplifier to the second mode if the tuned frequency is substantially similar to any of the one or more frequencies, otherwise configuring the second amplifier to the first mode.

17. The method of claim 16, wherein the one or more frequencies are based on a clock frequency utilized within the digital portion.

18. A low noise amplifier in an integrated circuit, the circuit having a digital portion and an analog portion on a common substrate, the digital portion having at least one clocking frequency, the low noise amplifier comprising:
an input configured to receive a signal at a tuned frequency; and
an output circuit configurable to operate in either a single-ended mode or a pseudo differential-ended mode, wherein the output circuit is configured in the pseudo differential-ended mode when the tuned frequency is substantially similar to the at least one clocking frequency or one of its harmonics and otherwise configured in the single-ended mode.

19. The low noise amplifier of claim 18, wherein the output circuit further includes:
a first side circuit in communication with the input and configured to generate a first amplifier output based on the signal and any noise coupled from the common substrate;
a second side circuit configured to generate a second amplifier output, wherein in the single-ended mode the second amplifier output is a high-impedance state and in the pseudo differential-mode the second amplifier output is related to noise coupled from the common substrate to the second amplifier; and
wherein the output circuit is configured to provide the first amplifier output and the second amplifier output as output signals of the low noise amplifier.

20. The low noise amplifier of claim 18, further comprising:
a memory configured to store the at least one clocking frequency; and
a controller coupled with the memory and configured to operate the output circuit in the first and second modes.

* * * * *